Jan. 19, 1937.  S. G. THOMSON  2,067,955
RAILWAY RAIL AND RAIL JOINT
Filed July 7, 1931  3 Sheets-Sheet 1

Inventor:
Samuel G. Thomson

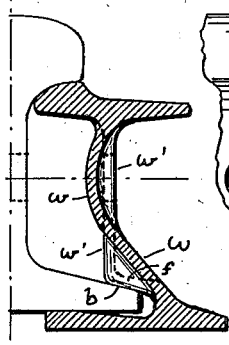
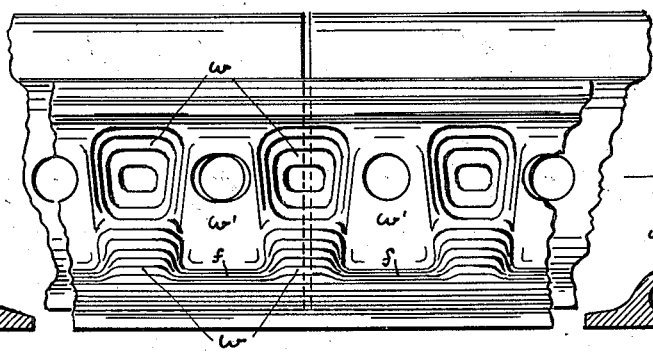
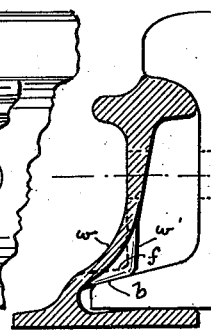
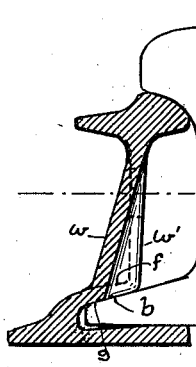
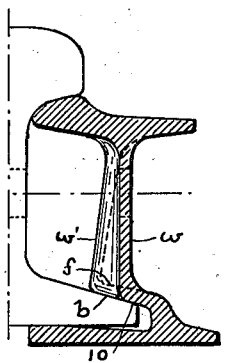
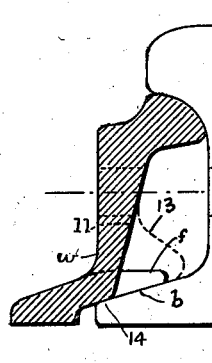
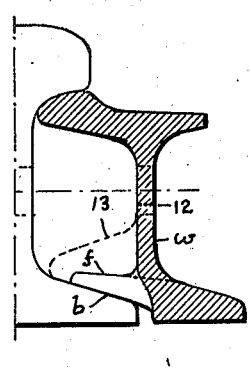
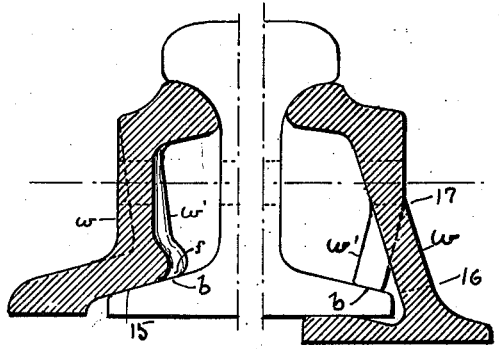
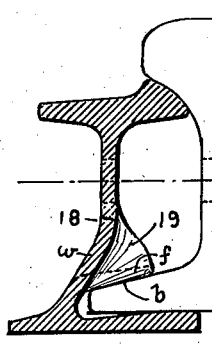
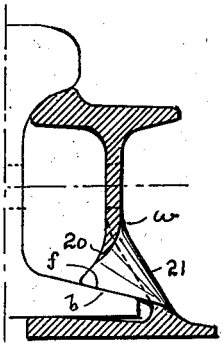

Jan. 19, 1937.  S. G. THOMSON  2,067,955
RAILWAY RAIL AND RAIL JOINT
Filed July 7, 1931   3 Sheets-Sheet 3

Inventor:
Samuel G Thomson

Patented Jan. 19, 1937

2,067,955

UNITED STATES PATENT OFFICE 2,067,955

RAILWAY RAIL AND RAIL JOINT

Samuel G. Thomson, Flushing, N. Y.

Application July 7, 1931, Serial No. 549,201

19 Claims. (Cl. 238—188)

This invention relates to an improved metal distribution in the section of the splice bar for rail-joints, and it applies particularly to the deep types of bars which have members below the rail base. The bulk of metal found in the mid-section of these deep types now in use, is very materially reduced by my improvement. This leaves, in the preferred forms, a thinly rolled web, which is reinforced and displaced from its rolled alignment intermittently along the bar, in order to engage the upper surface of the rail foot.

The excessive bulk of metal heretofore found in the mid-section of deep splice bars, has been used largely as a matter of necessity in order to afford a bearing for the bar on the upper surface of the rail foot. It is the basic idea of this invention to eliminate this enlarged mid-section of the bar and at the same time to substitute other means to engage the upper surface of the rail foot. Web-displacement effectively accomplishes these objects.

The deep-joint bars of the prior art are very wasteful in the use of metal, either because the splice bar has this bulk of metal rolled into its section adjacent to its horizontal neutral axis, or because the bar buckles in the angle over the rail foot long before the upper and lower fibers of the bar acting as a beam are stressed even to a very low efficiency. The lower portion of the bolting web of the bar may be pushed outwardly from its position in the old angle-bar in order to prevent buckling in the angle, and foot-bearing web-displacements embodying my invention permit the removal of metal wastefully used in the mid-section of the bar where it is of little value for vertical stiffness.

Some of my former patents show the lower portion of the upright bolting web of the splice bar set outwardly in a position adjacent to the outer edge of the rail foot, which feature is used in connection with my new improvement. In deep bar designs, this outer position transmits the strains directly to a laterally disposed member below the rail base, and it prevents the characteristic angle-bar buckling in the angle above the rail foot. Three of the patents referred to above, are: Numbers 831,579 and 831,580 dated Sept. 25, 1906, and Number 937,727 dated Oct. 19, 1909.

In my improved metal distribution, this reduction in the section of the bar immediately above the rail foot and adjacent to the horizontal neutral axis of the bar leaves the bolting member in the form of a high, thin web, such as easily can be pressed into position to engage the rail foot, as well as be reinforced into a strong and resilient connecting-web and bracing-member. My invention, therefore, prepares the way for the entrance of the pressing, stamping and forging industries into the field of rail-joint manufacture in a very practical and effective way. In the preferred forms, it provides a splice bar having a web of substantially uniform sectional "thinness" extending from the region above the bolt holes to a point adjacent to the upper outer corner of the rail foot. This web can be pressed, or partly cut and then pressed, with great facility into many types of reinforcement. Portions of it at intervals along the bar likewise can be displaced in many ways from its general alignment in order to afford the necessary bearing for the bar on the upper surface of the rail foot. These displaced portions of the web may be cut loose along one or more sides and attached to the adjoining web by gussets along the other side or sides. The cutting of the web in order to facilitate the displacing operation has only a very slight effect on the strength and stiffness of the bar, since the web is thin and the cutting is in the region of the horizontal neutral axis of the bar.

In some of the forms embodying my improvement, a portion of the upright bolting web used to effect a bearing on the rail foot is displaced from a position adjacent to the horizontal neutral axis of the bar to a lateral and more effective position substantially below said neutral axis. In other designs, the displacement of the web may serve triple functions, in affording: a bearing on the upper surface of the rail foot, a reinforcement of the thin web against the pull of the bolts, and a vertical gripping face for the bolt.

In the prior art, the bolting web of splice bars usually has been rolled with sufficient sectional thickness to resist the pull of the bolts. Some designs, however, have a thin neck or reduced web portion adjacent to the bolt holes; but in these designs, the height of this thinned zone of the web is so reduced by the encroachment of enlarged head and foot portions of the section, that forging and displacement to effect the above mentioned functions is impractical and unnecessary. The elimination of the enlarged central portion of the section over the rail foot by my improvement effects a thin web of much greater span vertically than has heretofore been possible to use as a means of economic metal distribution.

The various figures which illustrate this invention in the appended drawings, show a number of separate novel features which are not herein described or included in the claims of this application. These several novel features are not restricted in their scope to the construction and principles comprising this invention, and therefore, are made the subject-matter for other separate supplementary applications.

In addition to the economic, structural and manufacturing advantages over the prior art, my invention has some marked advantages under service conditions. The bars are very resilient on account of their light sectional thinness and flexible formation. This greatly reduces rail-battering and other bad effects in track which often result from splice-bar strength obtained by heavy sectional thickness and bulk of metal in the splice bar. This wasteful use of metal in the form of objectionable bulk and weight, is now a common fault with engineers who attempt to design a rail-joint having its stiffness and deflection equal to the unbroken rail by the use of splice bars limited in their depth to the space between the fishing angles of the rail. A deep bar which is extended below the rail base in accordance with my invention, effects a strong, lightweight rail-joint, the use of which will eliminate the anvil-pounding of the wheels over an excessive bulk of metal in the splice bars. Therefore, there is very little tendency for the blows of the passing wheels to cause rail-batter.

These light-section "structural-shape" splice bars may be designed to effect substantially the same deflection and flexibility under the wheel load at the rail-joint as elsewhere along the unbroken rail. This results in uniform riding smoothness over the track and uniform wear instead of batter at the rail ends.

The intermittent gripping engagement of the bars with the upper surface of the rail foot, effects a better and a more flexible fit and grip around the rail foot than does the rigid bearing extending continuously throughout the length of the bar. With the old types of bars having the continuous upper and under bearing on the rail foot, it has been necessary to make these gripping faces considerably less in area than the corresponding faces of the rail foot, for several reasons: to obtain bars which will adjust themselves to the usual rolling tolerances of bar and rail, to prevent a too-rigid clamping action from breaking the rail foot, and to prevent excessively large gripping faces from allowing normal slippage of the rail through the tightly clamped joint bars under variations of the rail length due to temperature changes. The intermittent foot-bearing feature of my invention provides a very much wider range of fit and flexibility in meeting these conditions than is possible with the designs of the prior art where the splice bar bearing extends rigidly and continuously along the upper surface of the rail foot.

The precise nature, novelty and combinations of these various features of my invention may best be understood by referring to the accompanying drawings, in which I have illustrated a number of the more desirable forms and combinations which may be effected by my improvement. It is presumed, however, that the invention is susceptible of many and various other modifications without departing from its spirit and scope as defined in the appended claims.

Figures 1, 3, 4, 6, 7, 9, 10, 12, and 13 to 21 inclusive, are sectional views of my invention illustrating some of the ways in which the web of a splice bar may be altered from the alignment of its rolled section in order to engage the upper surface of the rail foot.

Figures 2, 5, 8, 11, 22, are fragmentary side elevations of Figs. 1, 4, 7, 10, 21, respectively.

Figure 1:
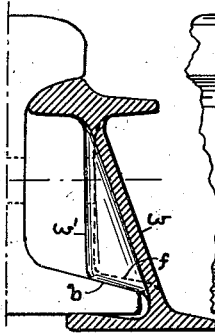

By referring to the sectional views of these drawings as enumerated above, it will be noted that the upright bolting web of the splice bar is rolled in a position to clear the upper surface of the rail foot, except in Figs. 13, 14, 15, and 17. In these Figs. 13, 14, 15, and 17, the rolled section of the bar provides a bearing along a narrow portion of the upper surface of the rail foot and extending uniformly for the entire length of the bar, while the displaced portions of the web effects intermittent increments to this continuous bearing along the upper surface of the rail foot.

In Figures 1 to 14 inclusive, it will be noted that the portions of the web, which are displaced primarily to engage the upper surface of the rail foot, also are effective in reinforcing the thin web against the direct pull of the bolts; and, in the designs not having the bolting web rolled in a vertical position, these displaced portions perform a third function in affording vertical gripping faces for the bolts.

In Figures 15 to 25 inclusive, the bolting web of the bars either are heavy enough in section to withstand the bolt-pull, or, the displaced portions of the web afford brace or thrust bearings against the upper surface of the rail foot, sufficient to prevent the bar from buckling inwardly along the centre line of the bolt holes before the full efficiency of the metal is reached in the top and bottom fibres of the splice bar.

There are a great many practical ways of applying my invention other than as illustrated in the drawings. Such other designs are dependent upon variations in the positions and shapes of the rolled web; also upon ways of displacing the web other than as shown in the drawings, whether by forging, cutting and pressing, or by the many combinations of cutting, pressing and stretching the adjacent parts of the web into reinforcing displacements and into connecting and strengthening gussets.

The designs illustrated by the drawings, except Figs. 15, 16, and 17, show the splice bar as having a wide laterally disposed member below the rail base, and a thin upright web joining this base-member adjacent to its middle. This formation, when joined to the middle portion of a wide head member, affords a splice bar having I-beam or H-beam shape and proportions, which, with a given amount of metal, effects the greatest strength vertically and laterally. The displacing of intermittent portions of the upright web in order to engage the upper surface of the rail foot, affords a desirable resiliency to the structure when the bars are bolted up to the rail. This resiliency eliminates many of the objectionable features of many modern rail-joints which have shallow bars and which depend for their strength and stiffness upon a massive section lying entirely above the rail base.

Further characteristics and differences in detail of the various forms and combinations which may be used to embody the principles of my invention may be understood best by referring to the following description of each figure of the drawings.

Similar reference characters designate corresponding parts throughout the various figures of the drawings.

The letter $w$, wherever seen, designates the upright bolting-web of the splice bar in the position in which the bar is rolled; $w'$, the position of the upright portion of the web-displacement; $f$, the laterally disposed wall or flange of the web-displacement, lying along the rail foot; b, the contacting under-surface of said lateral flange, engaging the upper surface of the rail foot.

Figure 2:
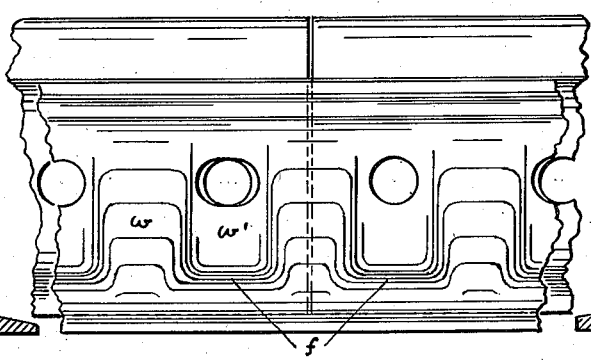

Figures 1 and 2 show the straight thinly rolled web w of the splice bar as slanting downwardly and outwardly to clear the rail foot, thus transmitting the strains directly to its laterally disposed base member. In order that the bar may engage the upper surface of the rail foot, portions of the thin web adjacent to the bolt holes are displaced inwardly to the position w', thus also affording vertical gripping faces for the bolts. This leaves the intervening portions w of the web in the originally rolled position between the bolt holes, thus forming slanting lateral braces which prevent the bolting-web from buckling inwardly, under the direct pull of the bolts. The portion f of the web is displaced downwardly to a position lying along the rail foot in order to afford engagement b with its upper surface.

Figure 3:
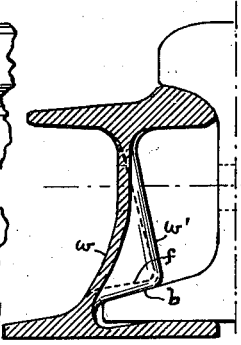

Figure 3 shows a bar in which the upper portion of web w is rolled in a vertical position, its lower portion bending outwardly to clear the rail foot. In this design, the portions between the bolt holes are pressed inwardly to position w' and downwardly to position f in order to afford foot-bearing b. These intermittently displaced portions also assist in strongly reinforcing the thin web, in the same way as shown in Fig. 1.

Figure 4:
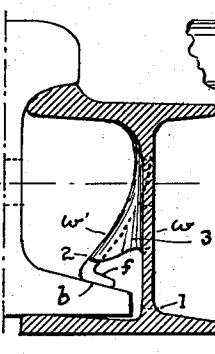
Figure 5:
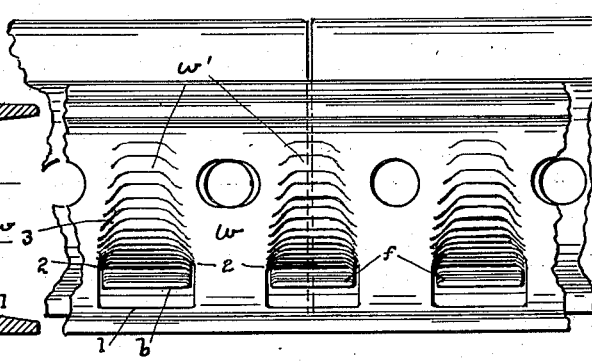

Figures 4 and 5 illustrate a bar with its web w rolled in a vertical position for its entire height, not curving outwardly at the bottom as in Fig. 3. This vertical web lying outside of the outer edge of the rail foot, affords a large space between the bar and the rail web which can be used for electrical rail-bonding when the bars are used for insulated rail-joints. Between the bolts, the web w is cut along the bottom at 1, and up along the sides to 2, the remaining portion of the web to the top being displaced inwardly to position w', thus forming gussets 3 joining the upper part of the displacement to the vertically rolled web w. The lower part of the liberated and displaced portion of the web is bent back to position f, thus lying along the rail foot and affording bearing b engaging its upper surface.

Figure 6:
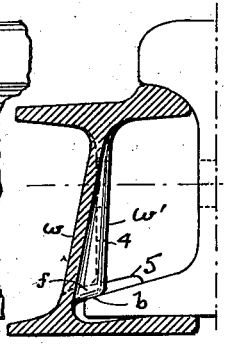

Figure 6 shows a bar with a slanting web w, which is altered adjacent to the bolt holes to a vertical position w'. The lower portion f of this altered web affords a limited bearing b on the upper surface of the rail foot adjacent to its outer edge. This limited bearing b is augmented by cutting the upright member w' at 4 and bending it down to position 5.

Figure 7:
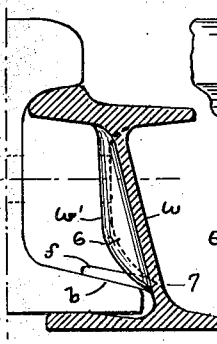
Figure 8:
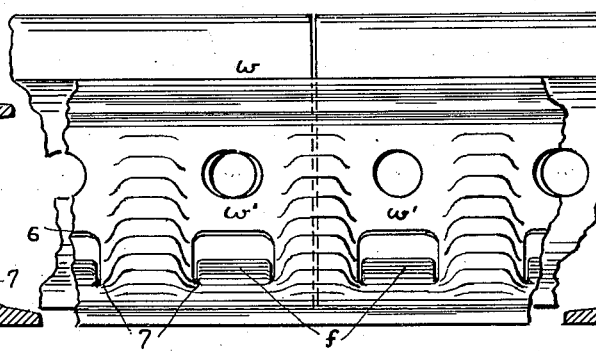

Figures 7 and 8 show a design similar to Fig. 6, except that the displaced web w' is kept clear of the upper surface of the rail foot. A portion f is cut loose horizontally from w' at 6 and downwardly along the sides to 7. This liberated portion f is then bent down to engage the upper surface of the rail foot at b.

Figure 9:
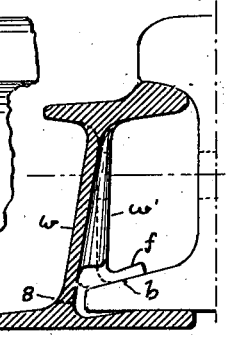

Figure 9 shows a design similar to Fig. 4, except that in Fig. 9 the displacement of the web is from a slanting position w to a vertical position w', while in Fig. 4 the web is displaced from a vertical to a slanting position. In Fig. 9, the lower end of the altered web is cut loose at 8 and bent inwardly to form f, which in turn affords bearing b on the rail foot. The greater part of the altered web w' is joined by gussets to the slanting web w. In this design, the altered web w' affords vertical gripping faces for the bolts, while in Fig. 4, the web is rolled vertical.

In the design illustrated in Figures 10 and 11, the upper curved portion of the web w is displaced outwardly, adjacent to the bolt holes, so as to form flat vertical bolting-web w', while the lower slanting portion of web w is displaced inwardly to the same vertical plane w' as the upper web. This lower displacement provides the engagement b with the upper surface of the rail foot. It will be noted that this displacing of the upper and lower portions of the web in opposite directions, also provides an effective reinforcement of the web throughout its full height.

Figure 12 shows a bolting web with a thickened and unaltered upper half, while the lower half is thin and intermittently displaced inwardly to afford seat b on the rail foot. This displacement also reinforces the thin neck portion of the web.

Figures 13 and 14 show designs in which the webs w are rolled to afford narrow bearings 9 and 10 respectively on the upper surface of the rail foot and extending the full length of the bar. In Fig. 13, the web w is displaced from a slanting to a vertical position w' at the bolt holes; while in Fig. 14, the web w is displaced from a vertical to a slanting position w' between the bolt holes. The result in both designs is, that portions f of the displaced webs w' provide additional bearing surfaces b intermittently along the bar to engage the rail foot and to augment continuous bearings 9 and 10. In these types, the bar has a continuous bearing along the outer upper surface of the rail foot, and it also has intermittent increases to this continuous bearing, the former being provided by the rolled section of the bar and the latter increments by web displacements.

Figures 15 and 16 show bars without any member below the rail base. The webs of these bars are cut at 11 and 12 respectively and the portions f are bent down to afford bearings b on the rail foot. Dotted lines 13 illustrate usual angle-bar sections, and the areas within these dotted lines may be taken to indicate the great proportion of the metal of the section of the bar which is saved by my invention. This bulk of metal extending throughout the length of the bar, is eliminated by my improvement, and intermittent bearings are substituted along the upper surface of the rail foot, these bearings being provided by portions displaced from the rolled alignment of the upright bolting web. This economy is much greater in the deep types of bars where the metal saved is taken from a zone nearer to the horizontal neutral axis of the section, where it is of little value for vertical stiffness. It will be noted that the bar in Fig. 15 has a rolled portion 14 to bear continuously along the upper surface of the rail foot, the same as in Figs. 13 and 14; while in Fig. 16, the bar is rolled to clear the rail foot.

Figure 17 illustrates the rolled section of an old-type angle-bar. Its web is intermittently pressed inwardly, thus effecting a corrugated or waved web. This stiffens the web laterally against the pull of the bolts, and also affords intermittent enlargements b of the bearing of the bar on the upper surface of the rail foot, these increments being additions to bearing 15, which is provided by the rolled section and which extends continuously along the full length of the bar.

Figure 18 shows a deep bar having a heavy bolting web. The section of this bar is about equivalent to the section of many bars now in common use. At intervals along the bar, a piece of its web w is cut loose horizontally along the bottom at 16 and upwardly around the sides to 17. These liberated pieces then are displaced inwardly to position w', so that the under faces of the portions sheared loose at 16 afford intermittent bearings b along the upper surface of the rail foot. This design may be modified by shearing the web, only along the bottom at 16, and then by stretching the web-metal along the sides of the displacement, between 16 and 17, into connecting and stiffening gussets.

In Figure 19, the web w is cut lengthwise of the bar at 18 and at the desired intervals. These liberated portions then are bent down to position f by stretching the adjoining web into side connecting gussets 19, thus affording rigidly braced bearings b on the rail foot.

Figure 20 shows the lower slanting portion of the web w cut along the two sides, 20 and b, of a triangle and bent downwardly along the third side 21, so that the sheared side b opposite to the bent side 21 affords bearing b on the rail foot.

Figure 21:
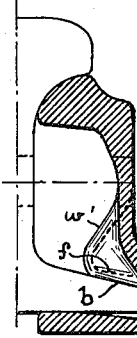
Figure 22:
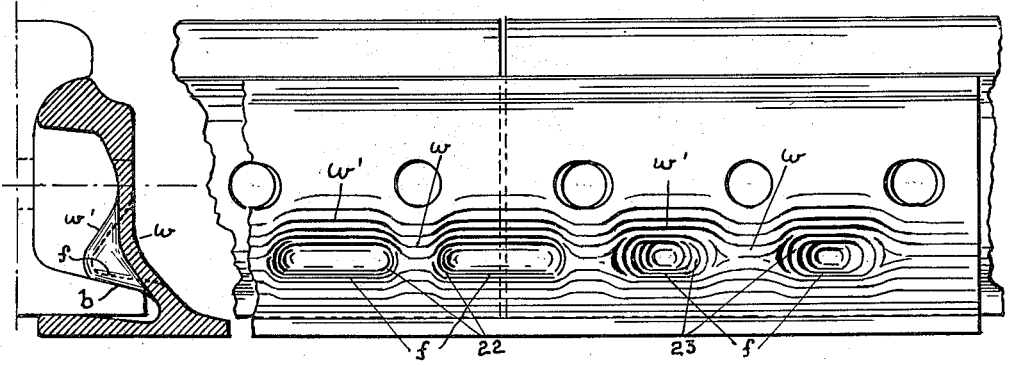

Figures 21 and 22 illustrate a method of inwardly bulging lower portions of the web w at intervals along the bar, to position w'. The lower wall f of these bulges or protuberances affords bearing b on the rail foot. The portions of the web w which remain unaltered between the bulges, form effective vertical braces to resist the bolt-pull and to stiffen the lower half of the web. By pushing the metal of the web steeply inward around the upright sides of these bulges, as at 22, the bearing b on the rail foot becomes almost rectangular, or perhaps slightly trapezoidal. When the upright sides of these bulges are pressed inwardly more gradually, as at 23, the protuberance then terminates inwardly in a blunt point and bearing b becomes triangular. In this design, the web w is undisturbed immediately below and adjacent to the bolt holes, thus effecting flat gripping faces for the bolts. It is obvious, however, that the web of the bar may be so designed that the bulges may lie directly under the bolt holes, as in Fig. 25; or these protuberances may extend lengthwise of the bar so as to lie under two or more bolt holes.

Figure 23:
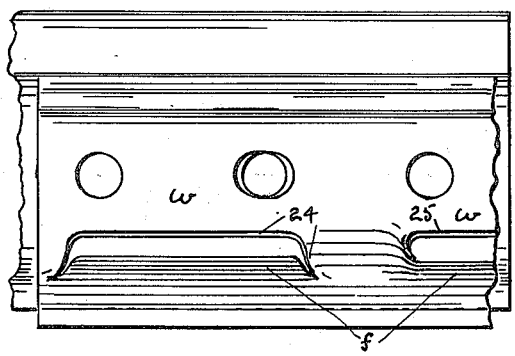
Figures 23 and 24 are fragmentary side elevations showing various other ways in which the web of the bar may be cut and displaced from its originally rolled alignment.

Figure 23 shows a method of shearing loose a piece of the web lengthwise of the bar and down along the sides, as at 24, and bending down the released piece f, as shown in section in Figs. 15 and 16. In the method shown at 25, the piece of the web is sheared only along the top and then bent down by stretching the adjacent web into connecting side-gussets, similar to Fig. 19.

Figure 24:
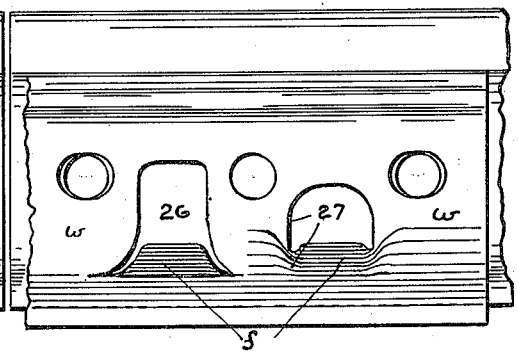

Figure 24 shows two other methods for cutting loose a piece of the web, the design shown at 26 having the upright sides cut down to the horizontally bent side; while at 27, the upright sides are partly cut and partly stretched into stiffening gussets. It is obvious that many other ways and methods for cutting the web may be followed in order to release or distort a piece of the web to such a position as will contact with the upper surface of the rail foot. These displacements may be from the regions between the bolt holes, as in Fig. 24, or from directly under one or two or more bolt holes, as in Fig. 23.

Figure 25:
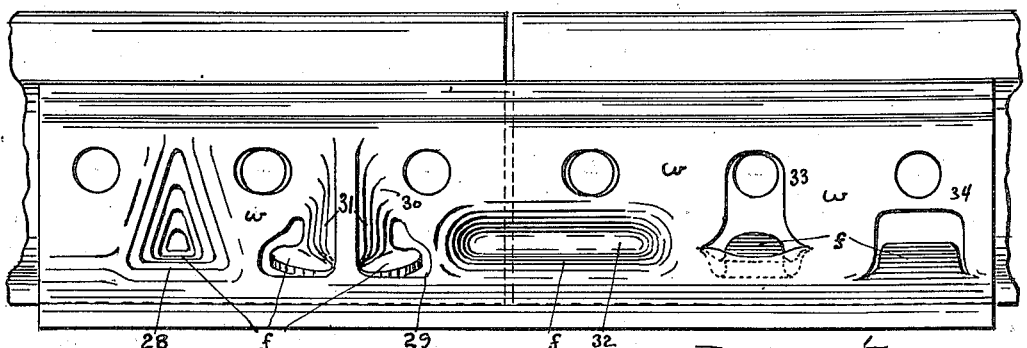
Figure 25 is a side elevation of a rail-joint in diagrammatic form to illustrate still other ways in which the web of the rolled section of the bar may be displaced to engage the upper surface of the rail foot.

Figure 25 is diagrammatic to illustrate in one bar a number of different ways of displacing the web. At 28, a triangular shaped bulge is effected in the same manner as the elliptical protuberances shown in Fig. 22. At 29, the lower outer rounded corner of a right-triangle is cut loose, and the liberated portion f is bent inwardly along part of the side 30 and joined to the vertical side by stretched connecting-gussets 31. At 32, the bulge is the same as shown in Fig. 22, except that at 32 the bulge is longer and extends through the region under the bolt holes as well as through the lower zone between the bolt holes. At 33, the displaced portion of the web includes metal lying over the bolt-hole area; while at 34, the displacement is rectangular and entirely below the bolt hole.

My invention, therefore, opens up a new and wide field for further rail-joint development. In the preferred forms, a bolting-web of substantially uniform sectional "thinness", spans a much greater distance between the head and the foot members of the bar than has heretofore been found possible. When a thin web of such height is joined at its top and bottom to wide laterally disposed flanges, a new type of light and stiff "structural-shape" splice bar is attained which approaches the I-beam and the H-beam in design, thinness, and proportion of flanges and webs. This yields a maximum efficiency in metal distribution. A new series of long-rolled "structural" shapes is created and classed as "splice-bar blanks", from which the rail-joint bars are sheared, forged and finished. In this finishing work, the new type of bar can be manufactured with facility by the mass production methods and processes now followed in the modern pressing, stamping and forging industries. When two of these high "beam-like" bars are bolted tightly to the rail by bolts adjacent to their mid-section or through the lower portion of their bolting webs, their top fulcrum bearings are forced inwardly and upwardly into concave bearings under the rail head where they are securely and solidly held, while their lower members are held tightly clamped under and around the rail foot. This forms a deep A-shaped or triangular girder, and affords a rail-joint embodying improved economy and serviceability, which, with a minimum of metal, possesses maximum strength, lightness and resiliency in all directions.

I claim:

1. In a rail-joint, a splice bar having a head, an upright bolting web and a foot, a portion of said web being displaced from the general lengthwise alignment of its section so as to engage the upper surface of the rail foot, another portion of the web remaining in its general alignment.

2. In a rail-joint, a splice bar having a head, a foot and an interposed web extending upwardly from its juncture with said foot adjacent to the upper outer corner of the rail foot, a portion of said web being displaced from the general lengthwise alignment of its section to engage the upper surface of the rail foot, another portion of the web above said juncture remaining in its general alignment.

3. In a rail-joint, a splice bar having a head, an upright web and a foot, a portion of said web being projected laterally from the general lengthwise alignment of its rolled section to afford load-bearing engagement with the upper surface of the rail foot, another portion of the web remaining in the general alignment of its rolled section.

4. In a rail-joint, a splice bar having a rolled section lying below the centre-line of its bolt-holes and above the plane of the upper surface of the rail foot, the innermost portion of said rolled section lying at as great a distance from the rail web as any part of the inner face of said rolled section above said innermost portion, said section varying intermittently from its rolled alignment to engage the upper surface of the rail foot.

5. In a rail-joint, a splice bar having a foot adjoined to a web adjacent to the upper outer corner of the rail foot, different portions along the length of said web diverging longitudinally and laterally from the planes of its rolled section to afford intermittent engagement with the upper surface of the rail foot.

6. In a rail-joint, a splice bar having a foot, and a web extending upwardly from it, portions of said web, separately spaced longitudinally, being displaced from the general lengthwise alignment of the web section to afford intermittent engagements along the upper surface of the rail foot.

7. In a rail-joint, a splice bar having upper engagement with the rail along the greater portion of the length of the bar, and lower engagement along the rail foot afforded by intermittent portions deflected from the lateral sectional planes of an upright web, said web extending without abrupt change in direction from the bolt holes to a point adjacent to the upper outer corner of the rail foot.

8. In a rail-joint, a splice bar having a rolled web and foot, a portion of said web being altered from the longitudinal planes of its rolled section so as to afford a load-carrying bearing on the upper surface of the rail foot, another portion of said web remaining within said longitudinal planes and extending upwardly without abrupt change in direction from its juncture with said foot of bar to a point above a horizontal plane at the inner edge of the upper surface of the rail foot.

9. In a rail-joint, a splice bar having head and foot members joined by a bolting web having a substantially uniform thickness between its junctures with said head and foot members, a portion of said web extending upwardly from a point adjacent to the upper outer corner of the rail foot, and another portion of said web having a different upright and lengthwise alignment than aforesaid portion and adapted to engage the upper surface of the rail foot.

10. In a rail-joint, a splice bar having a head and foot joined by an upright bolting web, said web having substantially uniform thickness and extending without abrupt change in direction from a point adjacent to the upper outer corner of the rail foot to the bolt holes, one portion of said web diverging abruptly from the upright and lengthwise alignment of another portion remaining in said upright position, said diverging portion being adapted to engage the upper surface of the rail foot.

11. In a rail-joint, splice bar having an upright web joined adjacent to the outer edge of the rail foot to inwardly and outwardly disposed flanges, two different portions of the length within the same upright zone of said web diverging in their lengthwise alignment, one of said portions being adapted to afford engagement with the upper surface of the rail foot.

12. In a rail-joint, a splice bar having a T-head and a foot joined by a bolting member lying in an upright position from a point adjacent to the upper outer corner of the rail foot to the bolt holes, a lengthwise portion of said upright member being disposed so that its outer lengthwise contour diverges from the contour of another lengthwise portion of said upright member along a horizontal plane intersecting both of said portions, one of said portions affording engagement with the upper surface of the rail foot.

13. In a rail-joint, a splice bar in the form of an I-beam or T-rail and having a head and foot joined by a relatively thin web of substantially uniform thickness of metal disposed in an upright position adjacent to the outer edge of the rail foot, one portion of said web diverging from the lengthwise alignment of another portion of said web along a horizontal plane intersecting both of said portions, one of said portions being adapted to engage the upper surface of the rail foot.

14. In a rail-joint, a splice bar having a web and a head to afford upper engagement with the rail along the greater portion of the length of the bar, and lower engagement with the upper surface of the rail foot provided by web portions diverging from the general lengthwise alignment of the bar, said bar having a point in its length where all of its cross-section comprised between a horizontal plane at the bottom of the bolt holes and the plane of the upper surface of the rail foot lies outside of a vertical longitudinal plane bisecting equally said upper surface.

15. In a rail-joint, a splice bar having a rail-engaging head, an upright web and a foot, said bar having a point in its length where all of its cross-section comprised between a horizontal plane at the bottom of the bolt holes and the plane of the upper surface of the rail foot lies outside of a vertical longitudinal plane bisecting equally said upper surface, a portion of the bar adjacent to its mid-length diverging from the general lengthwise alignment of the bar to engage said upper surface of the rail foot.

16. In a rail-joint, a splice bar having a foot adjoined to an upright web, a portion of said web diverging from the general lengthwise alignment of its section to afford a bearing on the upper surface of the rail foot, another portion of said web remaining in its general alignment, the total area of said bearing on the rail foot being greater outside than inside of a vertical longitudinal plane bisecting equally said upper surface.

17. In a rail-joint, a splice bar having a rail-engaging head, a foot, and a web extending with substantially uniform thickness and in an upright position and without abrupt change in direction from a point adjacent to the upper outer corner of the rail foot to bolt-holes thru said web, a portion of said web adjacent to the mid-length of the bar diverging from the lengthwise alignment of a similar portion of its section adjacent to the end of the bar in order to engage the upper surface of the rail foot.

18. In a rail-joint, a splice bar having a head, and a foot-member projecting inwardly from its juncture with a web adjacent to the outer edge of the rail foot, said web extending above said foot member and lying in an upright position adjacent to the outer edge of the rail foot, a portion of said web diverging from its general lengthwise alignment to engage the upper surface of the rail foot, another portion of the web remaining in said alignment within horizontal planes at the upper and lower limits of said diverging portion.

19. In a rail-joint, a splice-bar comprising a rail-engaging head, a web and a foot, said bar having a portion adapted to act as a brace between said web and foot at a point along the bar where all of the bar comprised between horizontal planes at the inner and outer edges of the upper surface of the rail foot lies outside of a vertical longitudinal plane bisecting equally said upper surface, another portion along the bar adjacent to its middle varying in its lengthwise alignment from the alignment of said bracing portion in order to engage said upper surface.

SAMUEL G. THOMSON.